US006796833B2

(12) United States Patent
Baker

(10) Patent No.: US 6,796,833 B2
(45) Date of Patent: Sep. 28, 2004

(54) MULTI-SERVER, QUICK SWAP RACK FRAME WIH CONSOLIDATED POWER DISTRIBUTION, INTEGRATED KEYBOARD/VIDEO/MOUSE CONCENTRATOR AND, USB HUB

(75) Inventor: Kenneth R. Baker, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 433 days.

(21) Appl. No.: 10/003,377

(22) Filed: Oct. 31, 2001

(65) Prior Publication Data

US 2003/0082960 A1 May 1, 2003

(51) Int. Cl.7 .............................................. H01R 13/66
(52) U.S. Cl. ....................... 439/540.1; 361/724; 211/26
(58) Field of Search ........................... 439/540.1, 928.1, 439/638; 361/724–727, 686, 683; 211/26; 312/265.1, 265.4

(56) References Cited

U.S. PATENT DOCUMENTS 5,993,241 A * 11/1999 Olson et al. ................ 439/378
6,325,636 B1 * 12/2001 Hipp et al. .................... 439/61
6,377,471 B1 * 4/2002 Chong et al. ................ 361/796
6,459,589 B2 * 10/2002 Manweiler et al. .......... 361/752
6,469,899 B2 * 10/2002 Hastings et al. ............. 361/724
6,483,709 B1 * 11/2002 Layton ........................ 361/724
6,498,716 B1 * 12/2002 Salinas et al. ............... 361/610
6,498,890 B1 * 12/2002 Kimminau ................... 385/134
6,520,345 B1 * 2/2003 Marovic et al. ............... 211/26
6,560,114 B2 * 5/2003 Berry et al. ................. 361/727
6,583,989 B1 * 6/2003 Guyer et al. ................ 361/724
6,628,513 B1 * 9/2003 Gallagher et al. ........... 361/685
6,661,671 B1 * 12/2003 Franke et al. ............... 361/752
6,719,149 B2 * 4/2004 Tomino ........................ 211/26

* cited by examiner

Primary Examiner—Gary Paumen

(57) ABSTRACT

The preferred embodiment comprises a rack with frames that facilitates easy installation of rack mount servers. Each frame consolidates the individual power receptacles into a single line cord by offering individual power control over each installed server. Each frame further consolidates the individual K/V/M connections into a concentrator switch embedded in the frame itself. This presents the user with a single K/V/M connection that is switchable between the installed servers via a user interface. Also included is a USB hub connecting all servers to a common USB interface. Alternatively, network, serial, and parallel ports can also be included.

21 Claims, 5 Drawing Sheets

MULTI-SERVER, QUICK SWAP RACK FRAME WIH CONSOLIDATED POWER DISTRIBUTION, INTEGRATED KEYBOARD/ VIDEO/MOUSE CONCENTRATOR AND, USB HUB

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to the technology of computer input devices, server racks, and power management devices. More particularly, the present invention relates to server racks with frames for housing multiple servers for communication with a user interface.

2. Background of the Invention

As is well known, a computer can execute a software application to perform virtually any desired function. As is also known, networking together more than one computer can increase processing capability. Each computer in the network then can be assigned one or more tasks to perform. By having a plurality of computers working in concert with each computer performing a portion of the overall set of tasks, the productivity of such a system is much greater than if only one computer was forced to perform the same set of tasks.

Large quantities of computer equipment are often deployed in a rack that is a mechanical structure for housing the computer components. Users typically have to individually mount the computers (usually servers) into a rack one at a time. Mounting is this manner requires individual hardware components for each server, including brackets, screws, nuts, rails, etc. In an environment where there are, for example, 42 servers in a rack, this means there can be dozens of brackets and hundreds of fasteners to individually maneuver. For obvious reasons, this amount of materials makes this installation process extremely labor intensive.

Each conventional server also requires a power cord. Thus, in an environment where there are 42 servers in a rack, there are 42 power cords to install. Further, each server typically has one or more network cables that must be connected to it. Also, individual servers employ discrete connections with keyboard, video, and mouse (KVM) input/output devices. Traditionally, these connections are cabled to a KVM concentrator located separately in the rack. The KVM concentrator typically requires three discrete cables for each server. In an environment where there are 42 servers in a rack, KVM connectivity alone can require some 126 cables to manage. The bottom line is that in conventional installations that are huge numbers of bulky cables that must be installed in a manner not to interfere with the installation of other components in the rack as well as to provide ease of maintenance. Cable arms are typically used in this regard. Even with cables arms, the density of the cable connections and number of cables often prevents users from easy access to the rear areas of the racks for maintenance of the servers or other components. Thus, it is very difficult and cumbersome to install as many severs in a rack as a user might desire.

Servers thus present a unique set of issues to customers: (1) cable management; (2) mechanical mounting; (3) K/V/M management; and (4) power management. What is needed is a multi-server rack mounting and management scheme that supports quick and easy server mounting, improved console management, and power distribution. It is also desired that the servers be "hot pluggable" such that they can be plugged in and out of the frame without having to make all the hardware and wire connections to the individual server. The mounting scheme should also maintain downward compatibility with existing systems, simplify installation, improve ease of use, and ease transition to modular systems.

BRIEF SUMMARY OF THE INVENTION

The problems above are solved in large part by a rack with frames that facilitates easy installation of rack mount servers. Each frame consolidates the individual power receptacles into a single line cord by offering individual power control over each installed server. Each frame further consolidates the individual K/V/M connections into a concentrator switch embedded in the frame itself. This presents the user with a single K/V/M connection that is switchable between the installed servers via a user interface. Also included is a USB hub connecting all servers to a common USB interface. Alternatively, network, serial, and parallel ports can also be included. All relevant connections are combined in a single, blind-mate, hot pluggable connector located in the rear panel of the frame for connection to the rear of each server. This allows users to quickly load and unload servers as needed in the rack by sliding the servers into the frame and mating the servers to the corresponding connectors.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DESCRIPTION OF THE PREFERRED EMBODIMENTS

Figure 1:
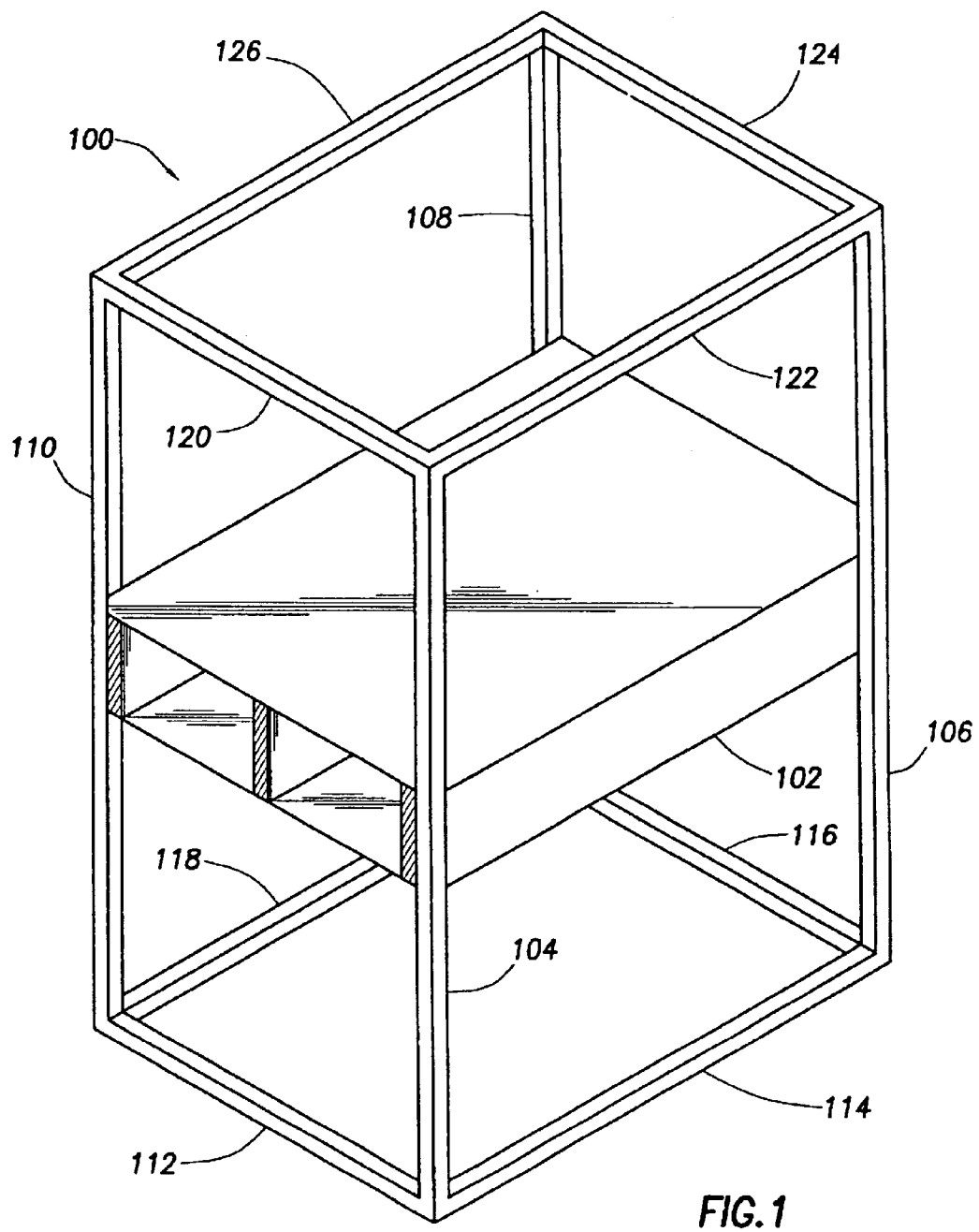
FIG. 1 shows a perspective view of a server rack with one frame constructed in accordance with the preferred embodiment.

Referring now to FIG. 1, server rack 100 is shown constructed in accordance with the preferred embodiment is shown. As shown, rack 100 includes a frame 102, although more than one frame can be included in the rack as desired. Server rack 100 comprises vertical support units 104, 106, 108, 110 and horizontal support units 112, 114, 116, 118, 120, 122, 124, 126. The server rack vertical support units 104, 106, 108, 110 also comprise holes for mounting the server frame 102 to the rack 100. The frame 102 is used for receiving components such as servers, disk drives, power supplies, and other components as may be desired.

Figure 2:
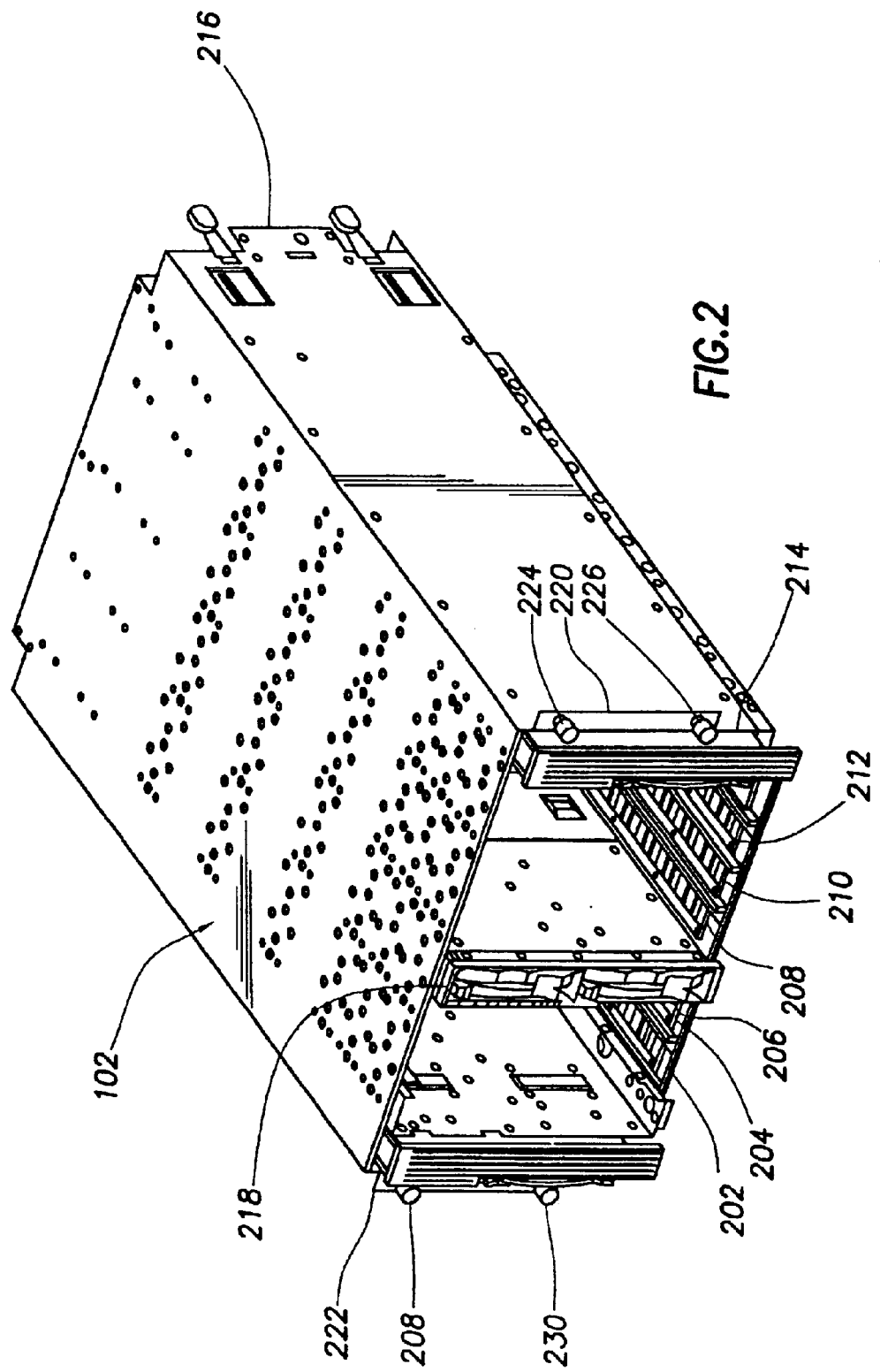
FIG. 2 shows a perspective view of the front of a server frame constructed in accordance with the preferred embodiment.

Referring now to FIG. 2, a front perspective view of the server frame 102 constructed in accordance with the preferred embodiment is shown. Server frame 102 preferably comprises a metal or structural frame that can be mounted to rack 100. Server frame 102 also comprises vertical slots 202, 204, 206, 208, 210, 212 that run horizontally from the front of the frame 214 to the back of the frame 216. These slots 202, 204, 206, 208, 210, 212 guide the insertion of the servers (not shown) into the frame 102. The number of slots can be in any practical increment, but typically 4, 6, 8 or 14 slots are used. The slots 202, 204, 206, 208, 212 preferably are split by a center divider 218 so that the same number of servers are on each side of the center divider 218. Server frame 102 also comprises rack mounting flanges 220, 222 and mounting screws 224, 226, 228, 230 for mounting the frame 102 to server rack 100.

Figure 3:
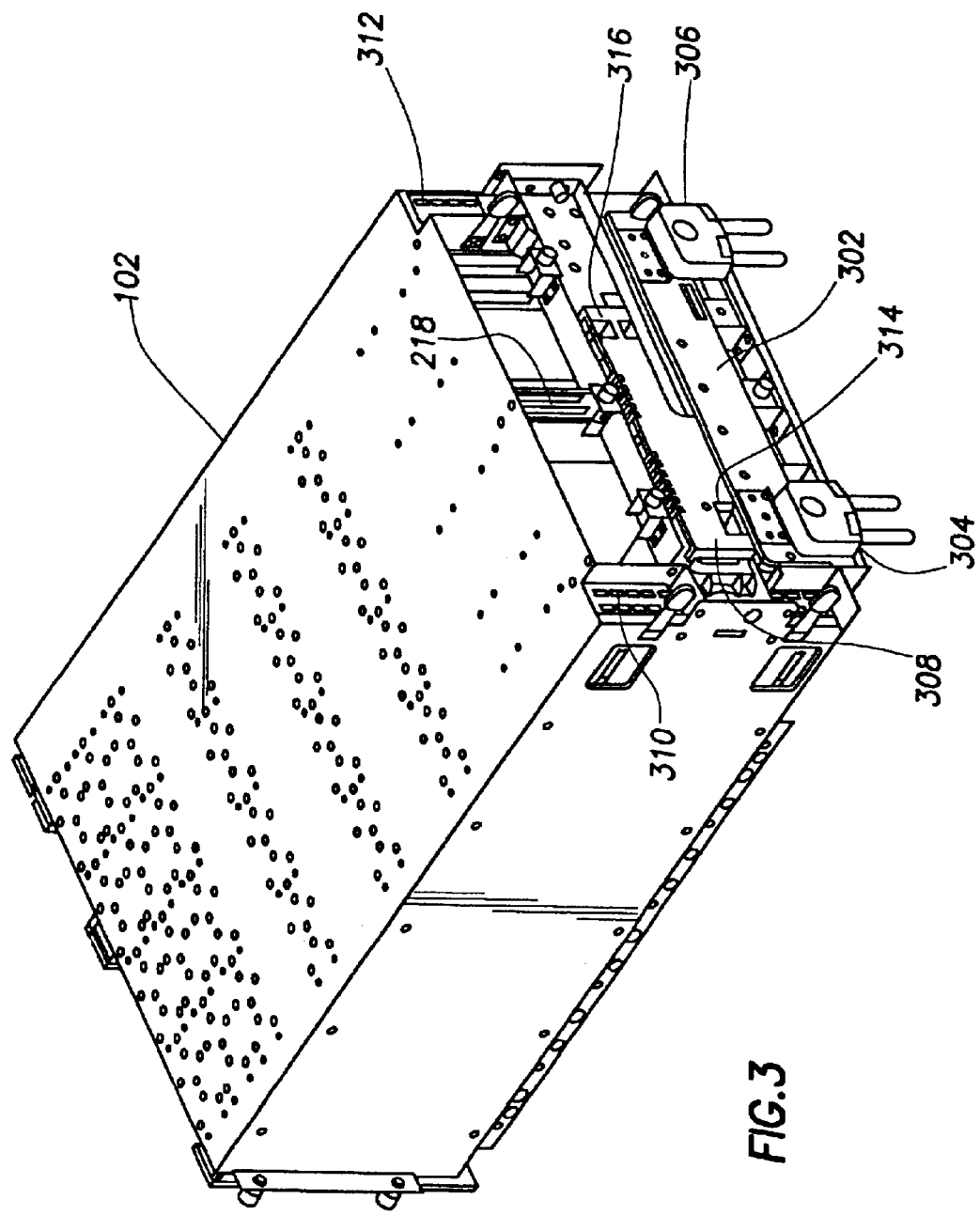
FIG. 3 shows a perspective view of the back of a server frame constructed in accordance with the preferred embodiment.

Referring now to FIG. 3, a rear perspective view of server frame 102 constructed in accordance with the preferred embodiment is shown. Server frame 102 comprises a power consolidator 302 coupled to first and second power connectors 304, 306. When the servers plug into the frame 102, they each connect to the power consolidator 302. Power is then provided to the servers through the power connectors 304, 306 and the power consolidator 302. One half of the servers are provided power through the first power connector 304 and the other half with the second power connector 306. Having the power consolidator 302 allows the user to only have two power lines connected to each frame's power connectors instead of a power line for each server.

Server frame 102 further preferably comprises a connection concentrator 308. The connection concentrator 308 concentrates the K/V/M and USB connections for each server. The individual K/V/M connections are concentrated into a concentrated K/V/M connection 314. The individual USB connections are concentrated into concentrated USB connection 316. The user is then able to access each server using a single K/V/M input and USB input. The user may then use the concentrator 308 to select, with software, a server with which to communicate. Having the connection concentrator 308 allows the user to only have a single K/V/M connector and a single USB connector for each frame instead of for each server as in may conventional designs.

The connection concentrator 308 also has network connectors but does not consolidate the network connections for all the servers. Instead, the network connections are individually wired to a first and second network panel 310, 312 on the frame 102 depending on which side of the frame divider 218 the server resides. The network connections are divided in half with one half of the servers' network connections routed to the first network panel 310 and the other half of the servers' network connections going to the second network panel 312. The network panels 310, 312 comprise individual network connections located along the rear of network panels 310, 312 corresponding to the number of servers. The connections allow the user to connect the servers to a network of external computers, but each server in frame 102 must be connected individually from the network panels 310, 312 to the external computers.

Figure 4:
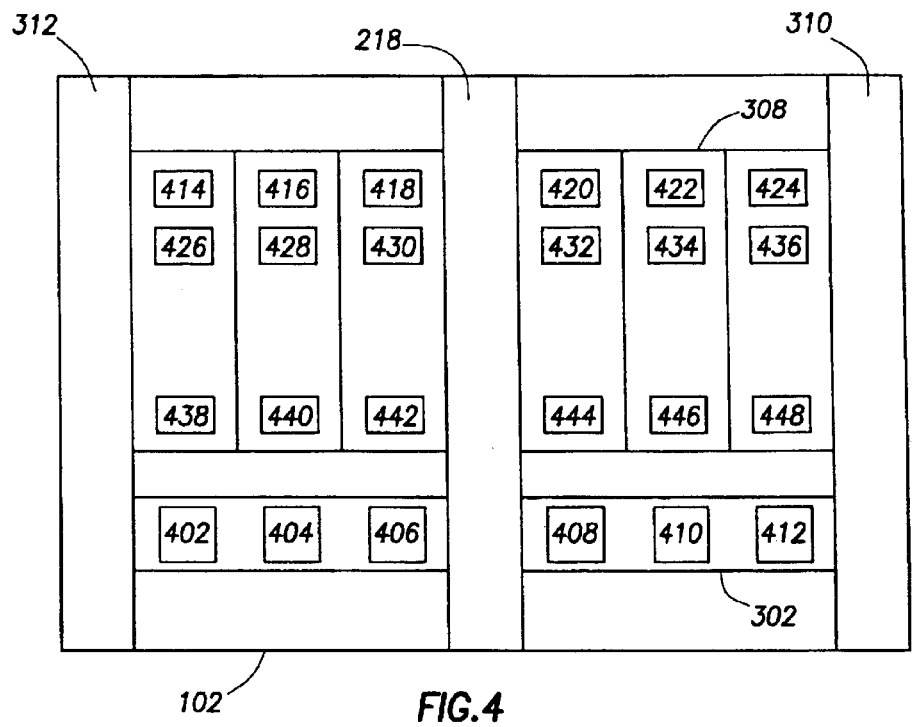
FIG. 4 shows a front elevation view of the server frame constructed in accordance with the preferred embodiment.

Referring now to FIG. 4, a front elevation view of server frame 102 constructed in accordance with the preferred embodiment is shown. This view represents a view of the frame 102 from the front of the frame 102 looking into the frame 102. Power consolidator 302 comprises power connections 402, 404, 406, 408, 410, 412 for connection to the corresponding power connections on each server. Connection concentrator 308 also comprises K/V/M connections 414, 416, 418, 420, 422, 424 and USB connections 426, 428, 430, 432, 434, 436 for connection to the corresponding K/V/M and USB connections on each server. The connection concentrator 308 also comprises network connections 438, 440, 442, 444, 446, 448 for connection to the corresponding network connections on each server. The connections on the connection concentrator 308 are capable of blind-mating with each server and are robust enough to carry power and signals for the K/V/M, network, and USB inputs. The user slides the servers into the frame 102, blind-mating the server connections to the corresponding frame connections on the power consolidator 302 and the connection concentrator 308.

Figure 5:
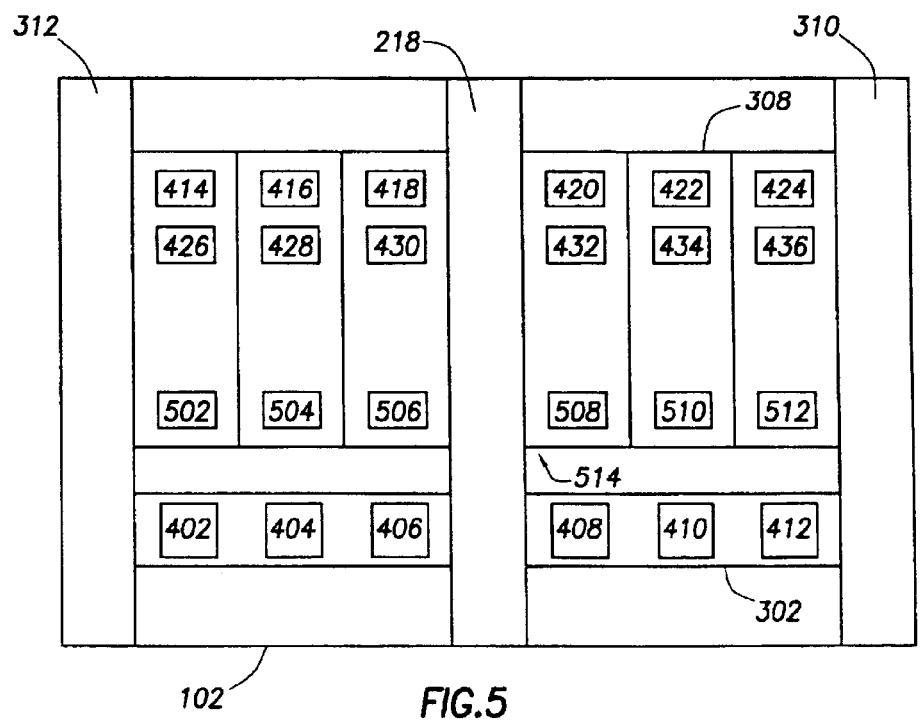
FIG. 5 shows a front elevation view of a server frame constructed in accordance with a first alternative embodiment.

Referring now to FIG. 5, frame 102 made in accordance with a first alternative embodiment is shown. The first alternative embodiment of frame 102 incorporates all of the elements discussed above except for the network connections. Instead, as shown in FIG. 5, the connection concentrator 308 also concentrates the network connections of all the servers. The connection concentrator 308 thus comprises network connections 502, 504, 506, 508, 510, 512 that are concentrated into a concentrated network connection 514 on the back of the connection concentrator 308. Having concentrated network connections allows the user to have only one network connection 514 for each frame instead of one for each server. The user may then select which server with which to communicate.

Figure 6:
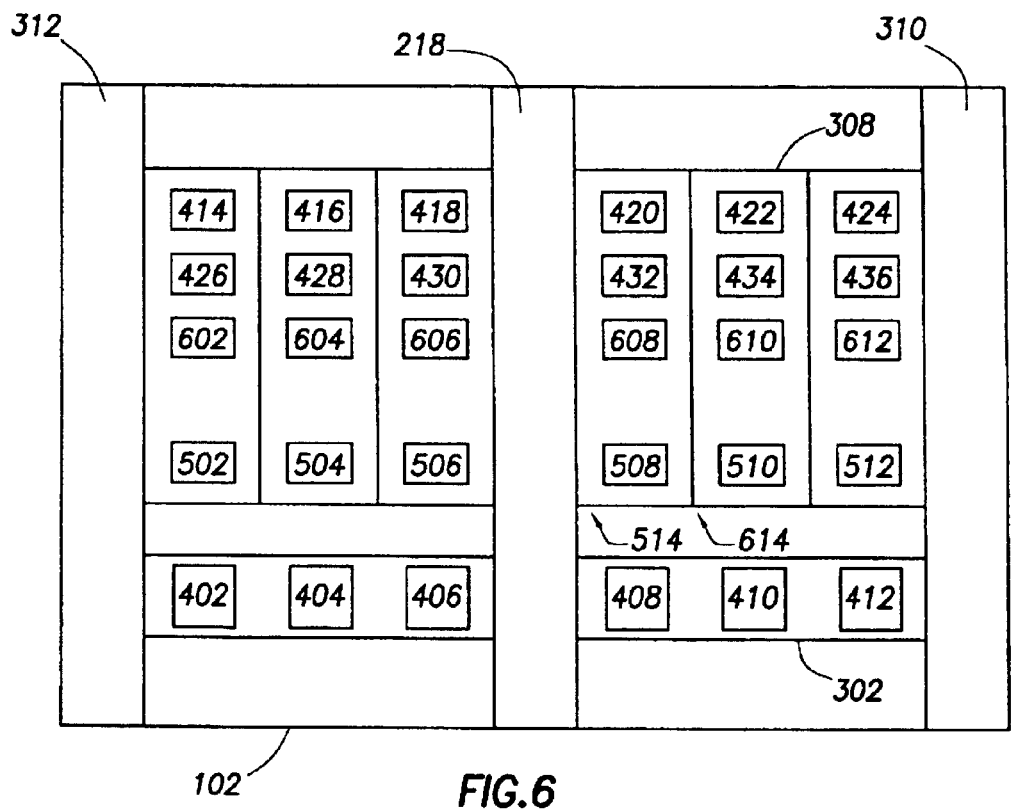
FIG. 6 shows a front elevation view of a server frame constructed in accordance with a second alternative embodiment.

Referring now to FIG. 6, frame 102 made in accordance with a second alternative embodiment is shown. The second alternative embodiment of frame 102 incorporates all of the elements discussed above in the preferred in embodiment and/or the first alternative embodiment. In the second alternative embodiment however, the connection concentrator 308 also comprises a serial port connection concentrator. The connection concentrator 308 thus comprises serial port connections 602, 604, 606, 608, 610, 612 that concentrate into a concentrated serial port connection 614 on the back of connection concentrator 308. Having the serial port connections concentrated allows the user to have only a single serial port connection 614 for each frame instead of for each server. Having the serial connections concentrated also allows the user to access each server's serial port by selecting which server with which to communicate.

Figure 7:
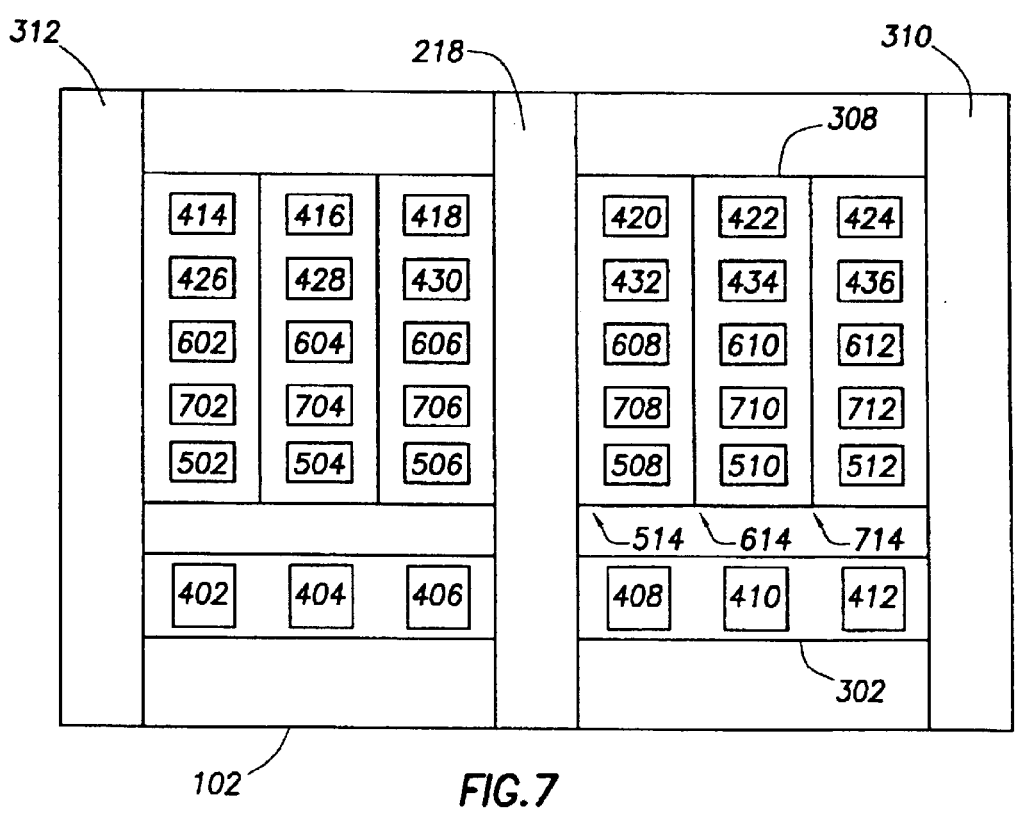
FIG. 7 shows a front elevation view of a server frame constructed in accordance with a third alternative embodiment.

Referring now to FIG. 7, frame 102 made in accordance with a third alternative embodiment is shown. The third alternative embodiment of frame 102 incorporates all of the elements discussed above in the preferred in embodiment, the first alternative embodiment, and/or the second alternative embodiment. In the third alternative embodiment however, the connection concentrator 308 also comprises a parallel port concentrator. The connection concentrator 308 thus comprises parallel port connections 702, 704, 706, 708, 710, 712 that are concentrated into a concentrated parallel port connection 714 on the back of connection concentrator 308. Having the parallel port connections concentrated allows the user to access each server's parallel port by selecting which server with which to communicate. Having the parallel connections concentrated also allows the user to have only a single parallel port connection 714 for each frame instead of for each server.

The preferred and alternative embodiments thus provide users numerous advantages over typical server rack set-ups. First the preferred and alternative embodiments save overall costs by reducing the materials needed as well as the labor costs by reducing the installation time in setting up the system. Second, the preferred and alternative embodiments save time by allowing users to swap servers in and out of the frames without having to reconnect each of the servers. Third, the preferred and alternative embodiments save space by reducing the number of power and input/output connectors needed for the server rack.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A multi-server rack comprising at least one frame for housing servers, the servers having power, keyboard, video, and mouse (K/V/M), and universal serial bus (USB) connections; a server power consolidator attached to the at least one frame that connects with and consolidates the servers' respective power connections; and a server K/V/M and USB connection concentrator attached to the at least one frame that connects with and consolidates the servers' respective K/V/M and USB connections.

2. The multi-server rack of claim 1 wherein the server power consolidator includes power connectors located on the power consolidator for connecting to the servers' power connections and at least one consolidated power connection for connecting power to the power consolidator.

3. The multi-server rack of claim 1 wherein the server K/V/M and USB connection concentrator includes K/V/M and USB connections located on the connection concentrator for connecting to K/V/M and USB connections on each of the servers and a consolidated K/V/M and USB connection located on the connection concentrator, the consolidated K/V/M and USB connections allowing one connector to be used for selective communication with the servers' K/V/M and USB connections.

4. The multi-server rack of claim 1 wherein the frame further comprises at least one frame network panel; the servers further include network connections; and wherein frame network connectors connect the servers' network connections to network connections on the at least one frame network panel such that outside network connectors may connect with the network panel connections and thus be connected with the servers' network connections.

5. The multi-server rack of claim 1 wherein the servers have network connections and the server K/V/M and USB connection concentrator further connects with and consolidates the servers' respective network connections.

6. The multi-server rack of claim 5 wherein the server K/V/M and USB connection concentrator includes network connections located on the connection concentrator for connecting to the network connections on each of the servers and a consolidated network connection located on the connection concentrator, the consolidated network connection allowing one connector to be used for selective communication with the servers' network connections.

7. The multi-server rack of claim 1 wherein the servers have parallel port connections and the server K/V/M and USB connection concentrator further connects with and consolidates the servers' respective parallel port connections.

8. The multi-server rack of claim 7 wherein the server K/V/M and USB connection concentrator includes parallel port connections located on the connection concentrator for connecting to the parallel port connections on each of the servers and a consolidated parallel port connection located on the connection concentrator, the consolidated parallel port connection allowing one connector to be used for selective communication with the servers' parallel port connections.

9. The multi-server rack of claim 1 wherein the servers have serial port connections and the server K/V/M and USB connection concentrator further connects with and consolidates the servers' respective serial port connections.

10. The multi-server rack of claim 9 wherein the server K/V/M and USB connection concentrator includes serial port connections located on the connection concentrator for connecting to the serial port connections on each of the servers and a consolidated serial port connection located on the connection concentrator, the consolidated serial port connection allowing one connector to be used for selective communication with the servers' serial port connections.

11. A multi-server frame for housing servers, the servers having power, keyboard, video, and mouse (K/V/M), and universal serial bus (USB) connections; a server power consolidator attached to the frame that connects with and consolidates the servers' respective power connections; and a server K/V/M and USB connection concentrator attached to the frame that connects with and consolidates the servers' respective K/V/M and USB connections.

12. The multi-server frame of claim 11 wherein the server power consolidator includes power connectors located on the power consolidator for connecting to the servers' power connections and at least one consolidated power connection for connecting power to the power consolidator.

13. The multi-server frame of claim 11 wherein the server K/V/M and USB connection concentrator includes K/V/M and USB connections located on the connection concentrator for connecting to K/V/M and USB connections on each of the servers and a consolidated K/V/M and USB connection located on the connection concentrator, the consolidated K/V/M and USB connections allowing one connector to be used for selective communication with the servers' K/V/M and USB connections.

14. The multi-server frame of claim 11 wherein the frame further comprises at least one frame network panel; the servers further include network connections; and wherein frame network connectors connect the servers' network connections to network connections on the at least one frame network panel such that outside network connectors may connect with the network panel connections and thus be connected with the servers' network connections.

15. The multi-server frame of claim 1 wherein the servers have network connections and the server K/V/M and USB connection concentrator further connects with and consolidates the servers' respective network connections.

16. The multi-server frame of claim 15 wherein the server K/V/M and USB connection concentrator includes network connections located on the connection concentrator for connecting to the network connections on each of the servers and a consolidated network connection located on the connection concentrator, the consolidated network connection allowing one connector to be used for selective communication with the servers' network connections.

17. The multi-server frame of claim 11 wherein the servers have parallel port connections and the server K/V/M and USB connection concentrator further connects with and consoildates the servers respective parallel port connections.

18. The multi-server frame of claim 17 wherein the server K/V/M and USB connection concentrator includes parallel port connections located on the connection concentrator for connecting to the parallel port connections on each of the servers and a consolidated parallel port connection located on the connection concentrator, the consolidated parallel port connection allowing one connector to be used for selective communication with the servers' parallel port connections.

19. The multi-server frame of claim 11 wherein the servers have serial port connections and the server K/V/M and USB connection concentrator further connects with and consolidates the servers' respective serial port connections.

20. The multi-server frame of claim 19 wherein the server K/V/M and USB connection concentrator includes serial port connections located on the connection concentrator for connecting to the serial port connections on each of the servers and a consolidated serial port connection located on the connection concentrator, the consolidated serial port connection allowing one connector to be used for selective communication with the servers' serial port connections.

21. The multi-server frame of claim 11 wherein the multi-server frame further includes mounts for mounting the frame into a server rack.

* * * * *

UNITED STATES PATENT AND TRADEMARK OFFICE
CERTIFICATE OF CORRECTION

PATENT NO. : 6,796,833 B2 Page 1 of 1
DATED : September 28, 2004
INVENTOR(S) : Kenneth R. Baker It is certified that error appears in the above-identified patent and that said Letters Patent is hereby corrected as shown below:

Title page,
Item [54], Title, correct the spelling of the word "WIH" to -- WITH --

Signed and Sealed this

Fifteenth Day of February, 2005

JON W. DUDAS
*Director of the United States Patent and Trademark Office*